United States Patent
Itou

(10) Patent No.: US 7,243,101 B2
(45) Date of Patent: Jul. 10, 2007

(54) PROGRAM, IMAGE MANAGING APPARATUS AND IMAGE MANAGING METHOD

(75) Inventor: Hiroaki Itou, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 820 days.

(21) Appl. No.: 10/345,367

(22) Filed: Jan. 16, 2003

(65) Prior Publication Data

US 2003/0138148 A1    Jul. 24, 2003

(30) Foreign Application Priority Data

Jan. 23, 2002    (JP) .............................. 2002-014820

(51) Int. Cl.
*G06F 7/00*    (2006.01)

(52) U.S. Cl. .................. 707/7; 707/2; 707/6; 715/838; 382/224; 382/225

(58) Field of Classification Search ............ 707/2, 707/6, 7; 715/838; 382/224, 225
See application file for complete search history.

(56) References Cited

U.S. PATENT DOCUMENTS

2002/0167538 A1*  11/2002  Bhetanabhotla ............. 345/700
2003/0009469 A1*   1/2003  Platt et al. .................. 707/100

* cited by examiner

*Primary Examiner*—Hung Pham
(74) *Attorney, Agent, or Firm*—Sughrue Mion, PLLC

(57) ABSTRACT

An image managing apparatus for managing a plurality of image data units includes: an image data acquiring unit for acquiring the image data units; an attribute information acquiring unit for acquiring attribute information units respectively associated with the image data units in such a manner that each attribute information unit corresponds to an associated one of the image data units; an image data classifying unit for classifying the image data units into a plurality of image-data groups based on the attribute information units; a thumbnail image creating unit for creating thumbnail image data units in order to display the image data units as thumbnail images; and a display unit for displaying the thumbnail images for each image-data group.

22 Claims, 6 Drawing Sheets

| GROUP ID | IMAGE ID | ATTRIBUTE INFORMATION ||||| IMAGE DATA |
| --- | --- | --- | --- | --- | --- | --- |
| | | CREATED DATE | TYPE | TITLE | LOCATION | |
| A | 1 | DEC. 13, PM | DATA FORMAT 1 | TEMPLE 1 | LATITUDE 37.5° NORTH LONGITUDE 135° EAST | data1.jpg |
| | 2 | DEC. 13, PM | DATA FORMAT 1 | TEMPLE 2 | LATITUDE 37.5° NORTH LONGITUDE 135° EAST | data2.jpg |
| B | 3 | DEC. 14, AM | DATA FORMAT 1 | BEACH 1 | LATITUDE 37.0° NORTH LONGITUDE 135° EAST | data3.jpg |
| ... | ... | ... | ... | ... | ... | ... |

PROGRAM, IMAGE MANAGING APPARATUS AND IMAGE MANAGING METHOD

This patent application claims priority from a Japanese patent application No. 2002-14820 filed on Jan. 23, 2002, the contents of which are incorporated herein by reference.

BACKGROUND OF THE INVENTION

1. Field of the Invention

The present invention relates to a program, an image managing apparatus, and an image managing method. More particularly, the present invention relates to a program, an image managing apparatus and an image managing method for managing data of a plurality of images.

2. Description of the Related Art

In recent years, an image processing apparatus, software, an image capturing apparatus and the like can display data of a plurality of images in form of list or table by reducing the sizes of the acquired images to create thumbnail images.

In a case where the image processing apparatus, the software, the image capturing apparatus and the like displays the thumbnail images of a number of images, it is desired that the image processing apparatus, the software, the image capturing apparatus and the like that allow a user to easily manage of data of the images.

SUMMARY OF THE INVENTION

Therefore, it is an object of the present invention to provide a program, an image managing apparatus and an image managing method, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a program for use with a computer for managing a plurality of image data units, comprises: an image data acquiring module instructing a computer to acquire the image data units; an attribute information acquiring module instructing the computer to acquire attribute information units respectively associated with the image data units in such a manner that each of the attribute information units corresponds to an associated one of the image data units; an image data classifying module instructing the computer to classify the image data units into a plurality of image-data groups based on the attribute information units; a thumbnail image creating module instructing the computer to create thumbnail image data units for displaying the image data units as thumbnail images; and a display module instructing the computer to display the thumbnail images for each of the image-data groups.

The attribute information acquiring module may instruct the computer to acquire, as the attribute information units, information units each indicating a creating date of an associated one of the image data units.

The attribute information acquiring module may instruct the computer to acquire, as the attribute information units, information units each indicating a type of an associated one of the image data units.

The program may further comprise an input module instructing the computer to receive user's input information, and the attribute information acquiring module may instruct the computer to acquire, as each of the attribute information units, the user's input information.

The attribute information acquiring module may instruct the computer to acquire, as the attribute information units, information units each indicating a captured position at which an associated one of the image data units was captured.

The display module may instruct the computer to display the thumbnail images, that respectively correspond to the image data units contained in the same image-data group, to overlap each other.

The program may further comprise an input module instructing the computer to receive a use's instruction indicating that the thumbnail image data units of the displayed thumbnail images are to be moved to another one of the image-data groups, and the image data classifying module may instruct the computer to classify the image data units into the image-data groups based on the user's instruction and the attribute information units.

The program may further comprise an image data analyzing module instructing the computer to analyze the image data units to create analysis information units for the respective image data units, and the image data classifying module may instruct the computer to classify the image data units into the image-data groups based on the attribute information units and the analysis information units.

The image data analyzing module may instruct the computer to analyze color distribution of each of the image data units to create information regarding a color as an associated one of the analysis information units.

The image data analyzing module may instruct the computer to determine a scene of each of the image data units to create information for identifying the scene as an associated one of the analysis information units.

According to the second aspect of the present invention, an image managing apparatus for managing a plurality of image data units comprises: an image data acquiring unit operable to acquire the image data units; an attribute information acquiring unit operable to acquire attribute information units respectively associated with the image data units in such a manner that each of the attribute information units corresponds to an associated one of the image data units; an image data classifying unit operable to classify the image data units into a plurality of image-data groups based on the attribute information units; a thumbnail image creating unit operable to create thumbnail image data units for displaying the image data units as thumbnail images; and a display unit operable to display the thumbnail images for each of the image-data groups.

The attribute information acquiring unit may acquire, as the attribute information units, information units each indicating a creating date of an associated one of the image data units.

The attribute information acquiring unit may acquire, as the attribute information units, information units each indicating a type of an associated one of the image data units.

The image managing apparatus may further comprise an input unit operable to receive user's input information, and the attribute information acquiring unit may acquire, as each of the attribute information units, the user's input information.

The attribute information acquiring unit may acquire, as the attribute information units, information units each indicating a captured position at which an associated one of the image data units was captured.

The display unit may display the thumbnail images, that respectively correspond to the image data units contained in the same image-data group, to overlap each other.

The image managing apparatus may further comprise an input unit operable to receive a use's instruction indicating that the thumbnail image data units of the displayed thumbnail images are to be moved to another one of the image-data groups, and the image data classifying unit may classify the image data units into the image-data groups based on the user's instruction and the attribute information units.

The image managing apparatus may further comprise an image data analyzing unit operable to analyze the image data units to create analysis information units for the respective image data units, and the image data classifying unit may classify the image data units into the image-data groups based on the attribute information units and the analysis information units.

The image data analyzing unit may analyze color distribution of each of the image data units to create information regarding a color as an associated one of the analysis information units.

The image data analyzing unit may determine a scene of each of the image data units to create information for identifying the scene as an associated one of the analysis information units.

According to the third aspect of the present invention, an image managing method for managing a plurality of image data units comprises: acquiring the image data units; acquiring attribute information units respectively associated with the image data units in such a manner that each of the attribute information units corresponds to an associated one of the image data units; classifying the image data units into a plurality of image-data groups based on the attribute information units; creating thumbnail image data units for displaying the image data units as thumbnail images; and displaying the thumbnail images for each of the image-data groups.

The summary of the invention does not necessarily describe all necessary features of the present invention. The present invention may also be a sub-combination of the features described above. The above and other features-and advantages of the present invention will become more apparent from the following description of the embodiments taken in conjunction with the accompanying drawings.

BRIEF DESCRIPTION OF THE DRAWINGS

FIG. 2 shows an exemplary data format of an image database 120.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
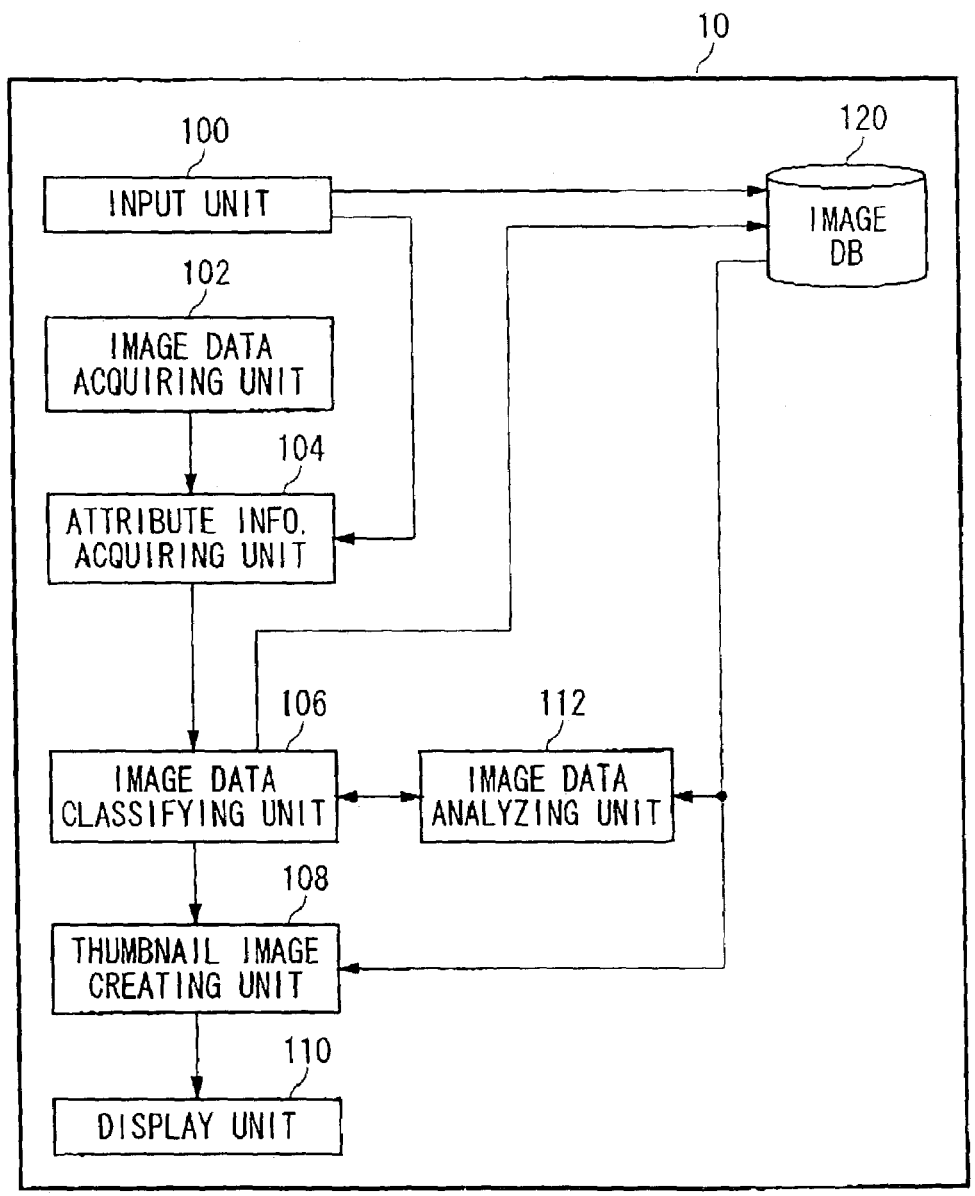
FIG. 1 is a block diagram showing a functional structure of an image managing apparatus according to an embodiment of the present invention.

FIG. 1 is a block diagram illustrating a functional structure of an image managing apparatus according to an embodiment of the present invention. The image managing apparatus classifies data units of a plurality of images into a plurality of image data groups based on attribute information associated with the respective image data unit. The image managing apparatus 10 includes an input unit 100, an image data acquiring unit 102, an attribute information acquiring unit 104, an image data classifying unit 106, a thumbnail image creating unit 108, a display unit 110, an image data analyzing unit 112 and an image database 120.

The image database 120 stores image data units. The image data acquiring unit 102 acquires a plurality of image data units and also acquires a plurality of units of attribute information of the respective image data units. The attribute information for each image data contains a created date at which the associated image data was created, a type of the associated image data and a captured position at which an image of the associated image data was captured. The image data acquiring unit 102 may receive the image data and the attribute information therefor from an image capturing unit for capturing an image, from a recording medium, or via a network. The image data acquiring unit 102 sends the image data units and the attribute information units therefor thus acquired to the attribute information acquiring unit 104.

The input unit 100 allows a user to input information regarding image data. For example, the input information is a title of the image data. The input unit 100 may receive a keyword as the input information. The input unit 100 sends the title thus input to the attribute information acquiring unit 104 as the attribute information. The attribute information acquiring unit 104 acquires the image data and the attribute information from the image data acquiring unit 102. The attribute information acquiring unit 104 receives the title of the image data from the input unit 100 as the attribute information. Then, the attribute information acquiring unit 104 sends the image data and the attribute information to the image data classifying unit 106 in such a manner that the attribute information is made to correspond to the associated image data. The image data classifying unit 106 sends the received image data to the image data analyzing unit 112.

The image data analyzing unit 112 analyzes the image data received from the image data classifying unit 106 to determine a scene of the image of the received image data, and then sends scene identifying information, indicating an identification of the scene as determined, to the image data classifying unit 106 in such a manner that the scene identifying information corresponds to the associated image data. More specifically, the image data analyzing unit 112 extracts image data created immediately before the image data received from the image data classifying unit 106, from the image database 120. The image data analyzing unit 112 analyzes the amount of change in color distribution between the extracted image data and the image data received from the image data classifying unit 106, so as to determine whether or not the scene in the received image data is the same as the scene in the extracted image data.

The image data classifying unit 106 classifies a plurality of units of image data into groups based on the attribute information received from the attribute information acquiring unit 104 and the scene identifying information received from the image data analyzing unit 112 for the respective image data unit. The image data classifying unit 106 stores, for each unit of the image data, group identifying information for identifying the group to which that image data belongs to and the attribute information for that image data, received from the attribute information acquiring unit 104, in the image database 120 so as to correspond to that image data. The image data classifying unit 106 also sends the group identifying information to the thumbnail image creating unit 108.

Then, the thumbnail image creating unit 108 extracts, from the image database 120, all the units of image data that are stored in the image database 120 so as to correspond to the group identifying information units received from the image data classifying unit 106. The thumbnail image creating unit 108 then creates thumbnail images for the extracted image data units and sends the created thumbnail images to the display unit 110. In a case where a plurality of units of image data were extracted, the thumbnail image creating unit 108 creates a thumbnail image for each extracted image data unit and sends it to the display unit 110. When receiving a plurality of thumbnail images, the display unit 110 creates an image to be presented in which the thumbnail images overlap each other. In another case where the display unit 110 receives only one thumbnail image, it uses the received thumbnail image as an image to be presented. The display unit 110 displays the image to be presented.

The input unit 100 allows the user to input an instruction indicating a certain thumbnail image is to be moved from the current group to another group. The input unit 100 changes the group identifying information associated with the image data corresponding to that thumbnail image, that is stored in the image database 120, based on the instruction thus input.

FIG. 2 shows an exemplary data format of the image database 120. The image database 120 stores image data based on the group. The image database 120 has a group ID field, an image ID field, an attribute information field, and an image data field.

The group ID field stores scene identifying information for identifying a scene of an image of the associated image data. The image ID field stores an image ID for identifying the associated image data. The attribute information field stores attribute information for the image data.

The attribute information has a created date field, a type field, a title field and a location field. The created date field stores information indicating a created date at which the associated image data was created. In a case where the image data is a captured image, the created date field stores a captured date. The type field stores information indicating a type of the associated data, such as a data format. The title field stores information indicating a title of the image data. The location field stores information indicating a position at which the image data was captured, for example, GPS information. The image data field stores the image data.

Figure 3:
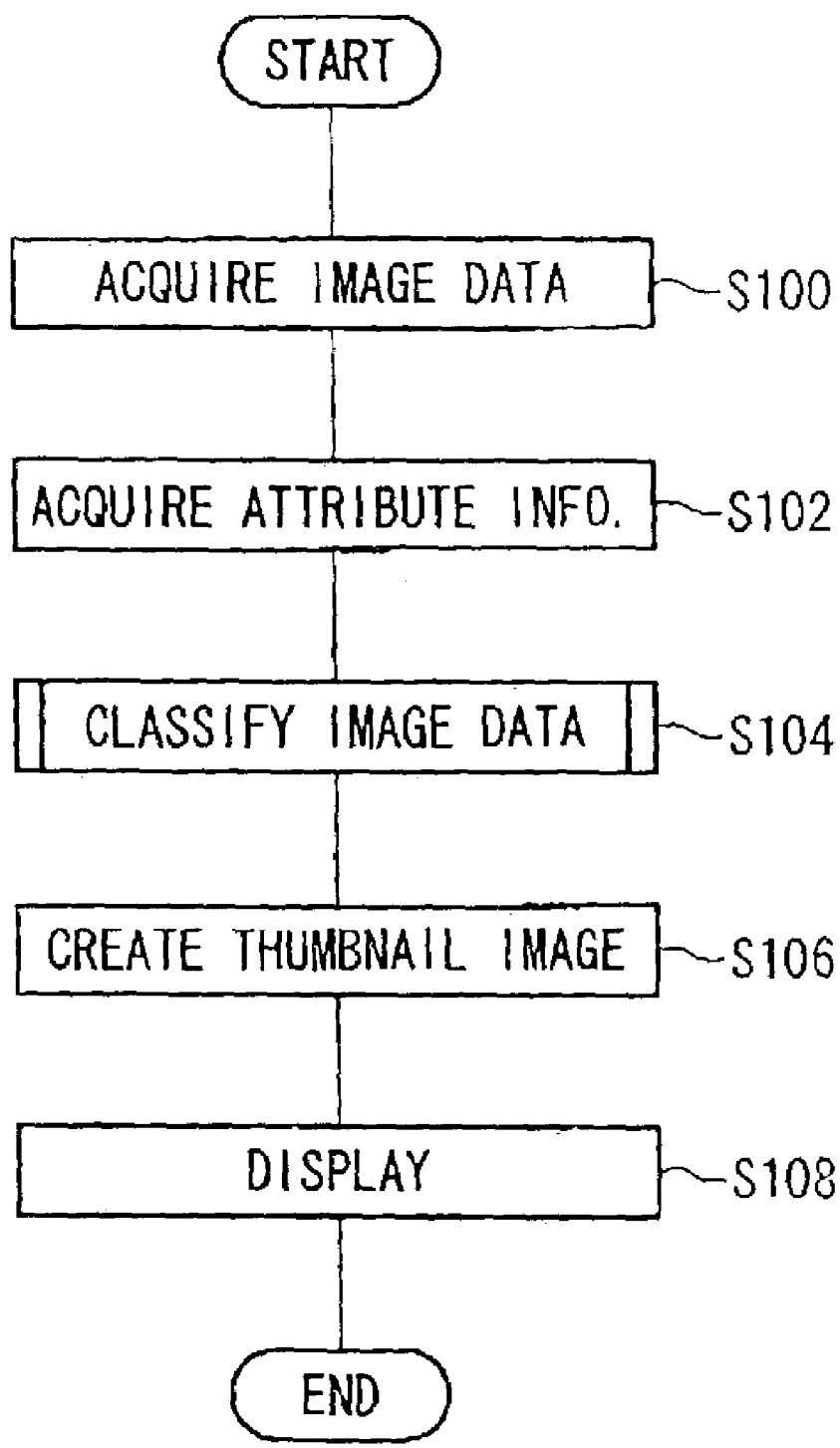
FIG. 3 is a flowchart showing an exemplary operation of the image managing apparatus 10.

FIG. 3 is a flowchart of an exemplary operation of the image managing apparatus 10. The image data acquiring unit 102 acquires image data (S100). Then, the acquiring information acquiring unit 104 acquires attribute information of the image data the image data acquiring unit 102 acquired. The input unit 100 receives a title of the image data from the user. The attribute information acquiring unit 104 acquires the title received by the input unit 100 as the attribute information (S102) Then, the image data classifying unit 106 classifies the image data acquired by the image data acquiring unit 102 into a group based on the attribute information acquired by the attribute information acquiring unit 104 (S104). Then, the thumbnail image creating unit 108 creates a thumbnail image or thumbnail images for each group (S106). Then, the display unit 110 creates for each group an image to be presented in which the thumbnail images of each group overlap each other. Finally, the display unit 110 displays the created image to be presented (S108).

In this way, the image managing apparatus 10 can classify the image data units based on the attribute information for each image data unit. The image managing apparatus 10 can also display a plurality of thumbnail images in such a manner that they overlap each other. Thus, the image managing apparatus 10 can provide an image to be presented that allows the user to easily view and manage the image data.

Figure 4:
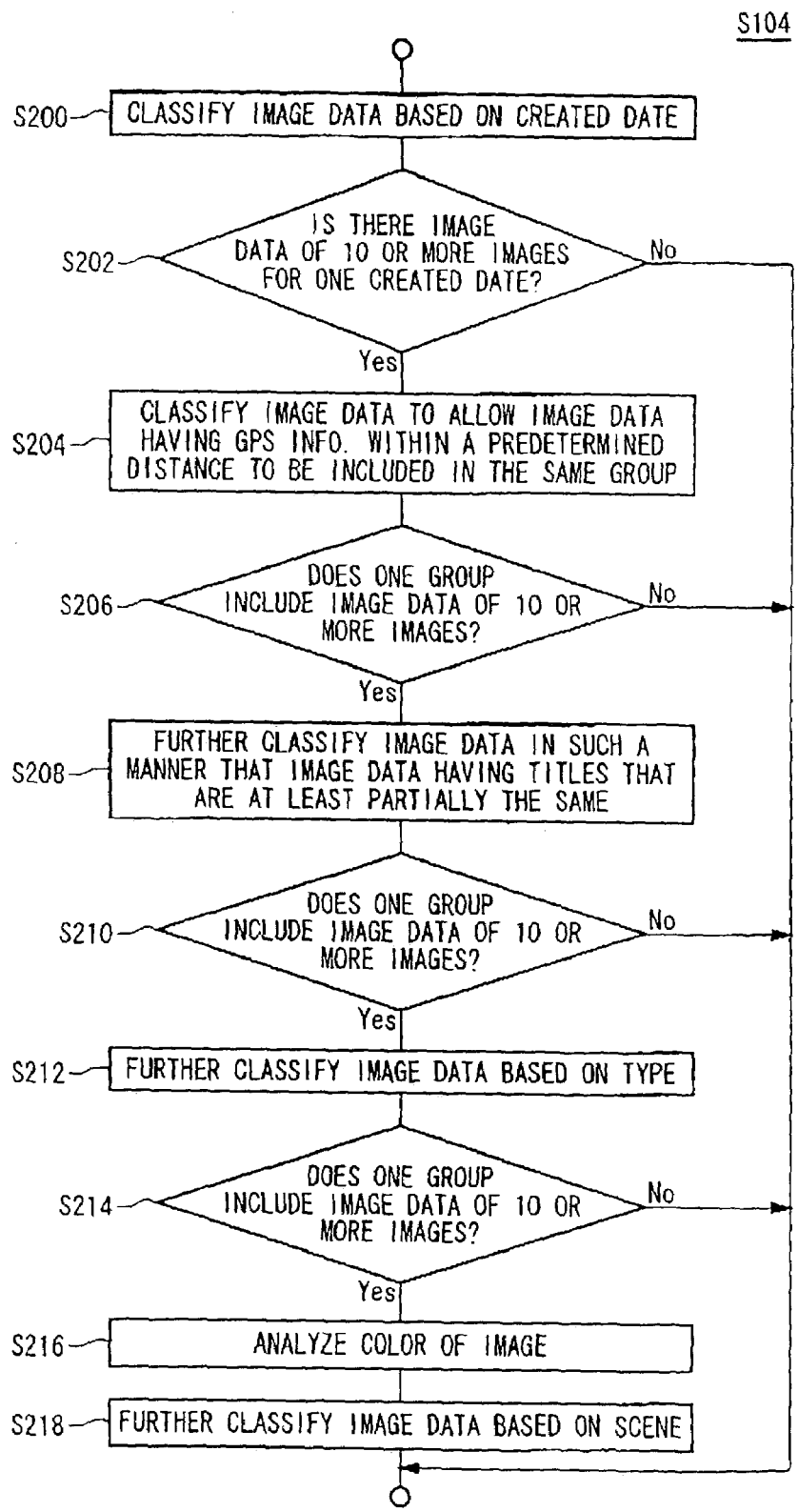
FIG. 4 is a flowchart showing an example of a detailed operation of the image managing apparatus 10 in Step S104 in FIG. 3.

FIG. 4 is a flowchart of an example of a detailed operation of the image managing apparatus 10, in Step S104 in FIG. 3. The image data classifying unit 106 classifies the image data depending on the created date, based on information showing the created date of the image data included in the attribute information acquired by the attribute information acquiring unit 104 (S200).

Then, the image data classifying unit 106 selects a group containing image data units, the number of which is equal to or larger than a predetermined number, for example, 10 (S202).

The image data classifying unit 106 then further classifies the image data units contained in the selected group based on the GPS information associated with the respective image data unit (S204). The image data classifying unit 106 classifies image data units having positions each shown by the associated GPS information, that are not within a predetermined distance, into different groups.

Then, the image data classifying unit 106 selects a group containing data units of 10 or more images (S206).

The image data classifying unit 106 further classifies the image data units contained in the selected group based on the titles associated with the respective image data units (S208). For example, in a case where image data units having titles of "Temple 1", "Temple 2", . . . and image data units having titles of "Beach 1", "Beach 2", . . . are included in the same group, the image data classifying unit 106 classifies the image data units "Temple 1", "Temple 2", . . . and the image data units "Beach 1", "Beach 2", . . . into different two groups.

Then, the image data classifying unit 106 selects a group containing 10 or more image data units (S210).

The image data classifying unit 106 further classifies the image data units contained in the selected group based on the information associated with the respective image data units, showing the types thereof (S212). For example, the image data classifying unit 106 classifies the image data units having different data formats into different groups.

The image data classifying unit 106 then selects a group containing 10 or more image data units (S214).

The image data analyzing unit 112 analyzes color distribution of the each image data unit contained in the selected group. More specifically, the image data analyzing unit 112 extracts a unit of image data included in the selected group and also extracts from the selected group another image data unit created immediately before the image data unit based on the information showing the created date. Then, the image data analyzing unit 112 analyzes the color distribution for each image data unit thus extracted, so as to determine that scenes of both the image data units are the same in a case where the change rate of the color distribution thus analyzed is equal to or smaller than a predetermined value (S216). Then, the image data classifying unit 106 classifies the image data units that were determined by the image data analyzing unit 112 to include the same scene, into the same group (S218).

On the other hand, in Steps S202, S206, S210, and S214, when the image data classifying unit 106 determines that no group contains 10 or more image data units, the image managing apparatus 10 finishes the operation in Step S104.

As described above, the image managing apparatus 10 can classify the image data units in a case where a group contains image data units, the number of which is equal to or larger than a predetermined number.

Figure 5:
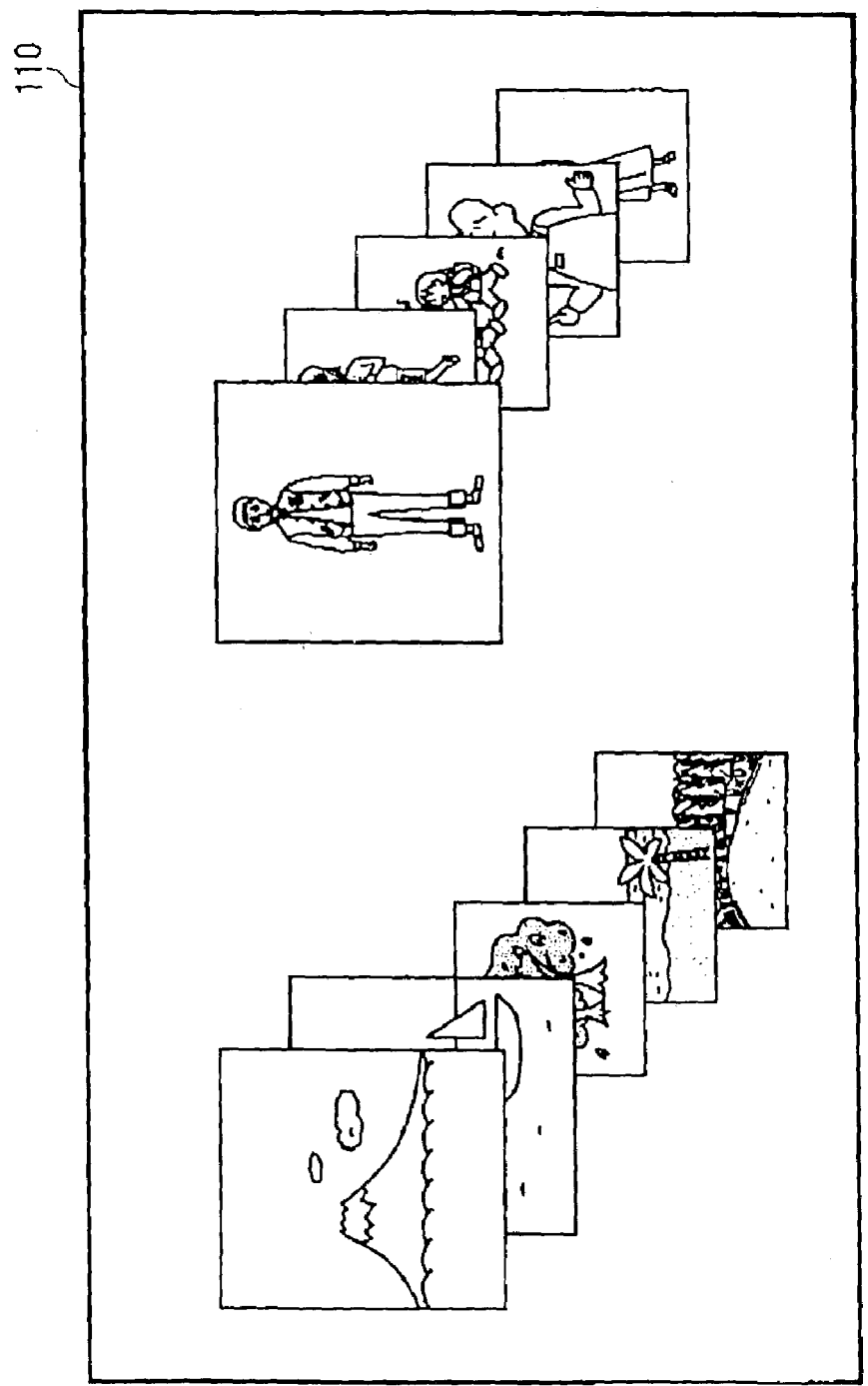
FIG. 5 shows an exemplary image to be presented by a display unit 110 in Step S108 in FIG. 3.

FIG. 5 illustrates an exemplary image to be presented by the display unit 110 in Step S108 in FIG. 3. The display unit 110 displays a plurality of thumbnail images of a plurality of image data units classified into the same group in such a manner that the thumbnail images overlap each other. Thus, the user can view the image data units created in the same time period, the image data units of the same type, the image data units having the same title or the image data units of the same scene simultaneously.

Figure 6:
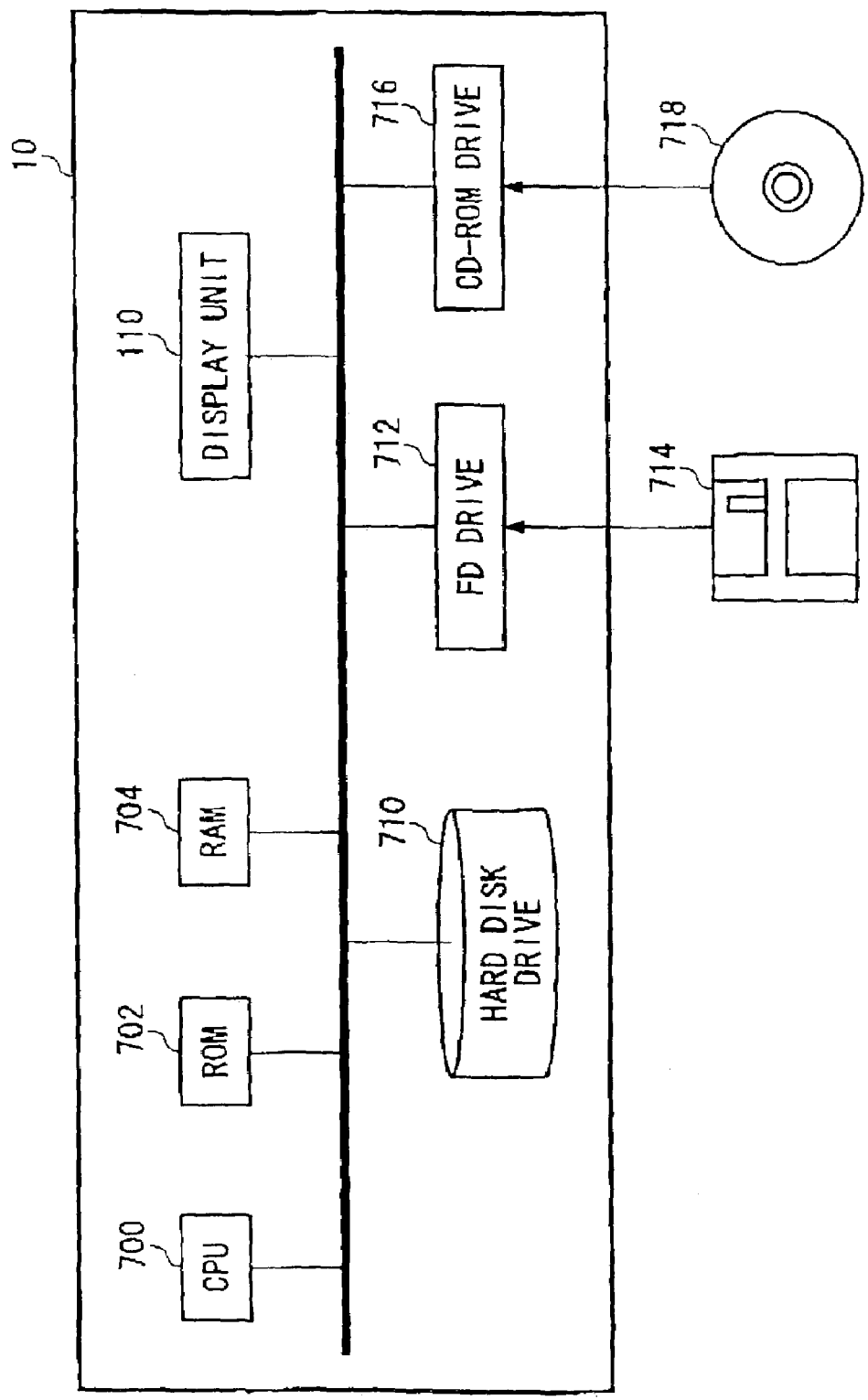
FIG. 6 is a block diagram showing a hardware configuration of the image managing apparatus 10.

FIG. 6 is a block diagram illustrating an exemplary hardware configuration of the image managing apparatus 10. The image managing apparatus 10 includes a CPU 700, a ROM 702, a RAM 704 and a display unit 110. The CPU 700 operates based on a program stored in the ROM 702 and the RAM 704. A hard disk drive 710 as an exemplary storage device stores setting information and the program in accordance with which the CPU 700 operates.

A floppy disk drive 712 reads data or a program from a floppy disk 714 and then provides the data or program to the CPU 700. A CD-ROM drive 716 reads data or a program from a CD-ROM 718 and then the read data or program to the CPU 700.

Software to be executed by the CPU 700 is provided to the user while being stored in a recording medium such as a floppy disk 714 or a CD-ROM 718. The software stored in the recording medium may be compressed or uncompressed. The software is installed from the recording medium into the hard disk drive 710 and is then read into the RAM 704 to be executed by the CPU 700.

The software that is stored in the recording medium to be provided to the user, that is, the software to be installed into the hard disk drive 710 includes an image data acquiring module, an attribute information acquiring module, an input module, a thumbnail image creating module, an image data classifying module, an image data analyzing module and a display module as a functional configuration. Operations to be performed by the CPU 700 in accordance with the instruction by the respective modules to the computer are the same as functions and operations of the corresponding components in the image managing apparatus 10 of the present embodiment, and therefore the description thereof is omitted.

The floppy disk 714 or the CD-ROM 719 as an exemplary recording medium, shown in FIG. 6, can store a part or all the functions of the image managing apparatus 10 of all the embodiments described in the present application.

The above-mentioned program may be read from the recording medium directly to the RAM to be executed, or may be read into the RAM to be executed after being installed into the hard disk drive; Moreover, the above-mentioned program may be stored in a single recording medium or a plurality of recording media. The modules to be stored in the recording medium may provide the functions thereof by cooperation with an operating system. For example, the modules may instruct the operating system to perform a part of or all the functions and then provide the functions in accordance with a response from the operating system.

The above-mentioned program or modules may be stored in an external recording medium. As the recording medium, an optical recording medium such as a DVD or PD, a magneto-optical recording medium such as an MD, a tape-like medium, a magnetic recording medium, a semiconductor memory such as an IC card or miniature card and the like can be used other than the floppy disk and the CD-ROM. In addition, a storage device provided in a server system connected to an exclusive communication network or the Internet, such as a hard disk or RAM, may be used as the recording medium so as to provide the program to the image managing apparatus 10 via the communication network. Moreover, the image managing apparatus 10 may be an image capturing apparatus.

It should be noted that the attribute information might be an image-captured condition although the attribute information of the present embodiment is a created date, a type, a title and a captured position. The image-captured condition is information indicating the amount of exposure, white-balance, the presence or absence of electronic flash, for example.

Although the image data analyzing unit 112 of the present embodiment determines the scene by analyzing the color distribution of the image data, it may determine the scene by recognizing an object such as a face of a person, a mountain, sea and a building included in the image data in an alternative embodiment.

As described above, according to the present invention can allow image data to be managed more easily.

Although the present invention has been described by way of exemplary embodiments, it should be understood that those skilled in the art might make many changes and substitutions without departing from the spirit and the scope of the present invention which is defined only by the appended claims.

What is claimed is:

1. A computer readable medium storing thereon a program for managing a plurality of image data units, comprising:
    an image data acquiring module instructing a computer to acquire said plurality of image data units;
    an attribute information acquiring module instructing said computer to acquire attribute information units respectively associated with said image data units in such a manner that each of said attribute information units corresponds to an associated one of said image data units;
    an image data classifying module instructing said computer to classify said image data units into a plurality of image-data groups based on a first attribute information unit of said attribute information units, to select an image-data group of the plurality of image-data groups having a number of image data units greater than or equal to a threshold number, and to continue to classify the selected image-data group into a plurality of image-data subgroups based on a second attribute information unit of said attribute information units, which is different from the first attribute information unit;
    a thumbnail image creating module instructing said computer to create thumbnail image data units for displaying said plurality of image data units as thumbnail images; and
    a display module instructing said computer to display said thumbnail images for each of said plurality of image-data groups and said plurality of image-data subgroups.

2. The computer readable medium as claimed in claim 1, wherein said attribute information acquiring module instructs said computer to acquire, as said attribute information units, information units each indicating a creating date of an associated one of said image data units.

3. The computer readable medium as claimed in claim 1, wherein said attribute information acquiring module instructs said computer to acquire, as said attribute information units, information units each indicating a type of an associated one of said image data units.

4. The computer readable medium as claimed in claim 1, further comprising an input module instructing said computer to receive user's input information,
wherein said attribute information acquiring module instructs said computer to acquire, as each of said attribute information units, said user's input information.

5. The computer readable medium as claimed in claim 1, wherein said attribute information acquiring module instructs said computer to acquire, as said attribute information units, information units each indicating a captured position at which an associated one of said image data units was captured.

6. The computer readable medium as claimed in claim 1, wherein said display module instructs said computer to display said thumbnail images, that respectively correspond to said plurality of image data units contained in the same image-data group, to overlap each other.

7. The computer readable medium as claimed in claim 1, further comprising an input module instructing said computer to receive a user's instruction indicating that said thumbnail image data units of said displayed thumbnail images are to be moved to another one of said image-data groups,
wherein said image data classifying module instructs said computer to classify said plurality of image data units into said plurality of image-data groups based on said user's instruction and said attribute information units.

8. The computer readable medium as claimed in claim 1, further comprising an image data analyzing module instructing said computer to analyze said image data units to create analysis information units for said respective image data units,
wherein said image data classifying module instructs said computer to classify said plurality of image data units into said plurality of image-data groups based on said attribute information units and said analysis information units.

9. The computer readable medium as claimed in claim 8, wherein said image data analyzing module instructs said computer to analyze color distribution of each of said image data units to create information regarding a color as an associated one of said analysis information units.

10. The computer readable medium as claimed in claim 8, wherein said image data analyzing module instructs said computer to determine a group of each of said plurality of image data units to create information for identifying said group as an associated one of said analysis information units.

11. The computer readable medium as claimed in claim 1, wherein said image data classifying module automatically continues to classify until no image-data group has image data units equal to or greater than the threshold number.

12. An image managing apparatus for managing a plurality of image data units comprising:
a processor;
an image data acquiring unit which acquires said plurality of image data units;
an attribute information acquiring unit which acquires attribute information units respectively associated with said image data units in such a manner that each of said attribute information units corresponds to an associated one of said image data units;
an image data classifying unit which classifies said image data units into a plurality of image-data groups based on a first attribute information unit of said attribute information units, selects an image-data group of the plurality of image-data groups having a number of image data units greater than or equal to a threshold number, and continues to classify the selected image-data group into a plurality of image-data subgroups based on a second attribute information unit of said attribute information units, which is different from the first attribute information unit;
a thumbnail image creating unit which creates thumbnail image data units for displaying said plurality of image data units as thumbnail images; and
a display unit which displays said thumbnail images for each of said plurality of image-data groups and said plurality of image-data subgroups.

13. An image managing apparatus as claimed in claim 12, wherein said attribute information acquiring unit acquires, as said attribute information units, information units each indicating a creating date of an associated one of said image data units.

14. An image managing apparatus as claimed in claim 12, wherein said attribute information acquiring unit acquires, as said attribute information units, information units each indicating a type of an associated one of said image data units.

15. An image managing apparatus as claimed in claim 12, further comprising an input unit which receives user's input information,
wherein said attribute information acquiring unit acquires, as each of said attribute information units, said user's input information.

16. An image managing apparatus as claimed in claim 12, wherein said attribute information acquiring unit acquires, as said attribute information units, information units each indicating a captured position at which an associated one of said image data units was captured.

17. An image managing apparatus as claimed in claim 12, wherein said display unit displays said thumbnail images, that respectively correspond to said plurality of image data units contained in the same image-data group, to overlap each other.

18. An image managing apparatus as claimed in claim 12, further comprising an input unit which receives a user's instruction indicating that said thumbnail image data units of said displayed thumbnail images are to be moved to another one of said image-data groups,
wherein said image data classifying unit classifies said plurality of image data units into said plurality of image-data groups based on said user's instruction and said attribute information units.

19. An image managing apparatus as claimed in claim 12, further comprising an image data analyzing unit which analyzes said image data units to create analysis information units for said respective image data units,
wherein said image data classifying unit classifies said plurality of image data units into said plurality of image-data groups based on said attribute information units and said analysis information units.

20. An image managing apparatus as claimed in claim 19, wherein said image data analyzing unit analyzes color distribution of each of said image data units to create information regarding a color as an associated one of said analysis information units.

21. An image managing apparatus as claimed in claim 19, wherein said image data analyzing unit determines a group of each of said plurality of image data units to create information for identifying said group as an associated one of said analysis information units.

22. An image managing method for managing a plurality of image data units comprising:

acquiring said plurality of image data units;

acquiring attribute information units respectively associated with said image data units in such a manner that each of said attribute information units corresponds to an associated one of said image data units;

classifying said image data units into a plurality of image-data groups based on a first attribute information unit of said attribute information units, selecting an image-data group of the plurality of image-data groups having a number of image data units greater than or equal to a threshold number, and continuing to classify the selected image-data group into a plurality of image-data subgroups based on a second attribute information unit of said attribution information units, which is different from the first attribute information unit;

creating thumbnail image data units for displaying said plurality of image data units as thumbnail images; and displaying said thumbnail images for each of said plurality of image-data groups and said plurality of image-data subgroups.

* * * * *